US006805230B2

(12) United States Patent
Correggi et al.

(10) Patent No.: US 6,805,230 B2
(45) Date of Patent: Oct. 19, 2004

(54) PALLETIZER FOR ARTICLES MANIPULATED BY SUSPENSION

(75) Inventors: Ciro Correggi, Montecchio Emilia (IT); Francesco Manghi, Montecchio Emilia (IT)

(73) Assignee: Zecchetti S.R.L., Montecchio Emilia (IT)

( * ) Notice: Subject to any disclaimer, the term of this patent is extended or adjusted under 35 U.S.C. 154(b) by 8 days.

(21) Appl. No.: 10/375,021

(22) Filed: Feb. 28, 2003

(65) Prior Publication Data

US 2003/0168314 A1 Sep. 11, 2003

(30) Foreign Application Priority Data

Mar. 7, 2002 (IT) ...................................... RE2002A0019

(51) Int. Cl.[7] .............................................. B65G 47/26
(52) U.S. Cl. ........................ 198/432; 198/427; 414/299; 53/448; 53/152; 53/543
(58) Field of Search ................................ 198/427, 432; 414/299; 53/448, 152, 543

(56) References Cited

U.S. PATENT DOCUMENTS 5,060,455 A * 10/1991 Schmeisser .................. 53/448
6,196,788 B1 * 3/2001 Talbot et al. ................. 53/543
6,688,839 B1 * 2/2004 Hirschek et al. ............ 414/799

* cited by examiner

Primary Examiner—Joseph E. Valenza
(74) Attorney, Agent, or Firm—Browdy and Neimark, P.L.L.C.

(57) ABSTRACT

A palletizer for bottles having loader carriage with a plurality of horizontal corridors (11) formed by pairs of laterally adjustable guides (21), which suspend the collars (92) of the bottles, and pairs of laterally adjustable side walls (31), which can move toward each other to lock the bottle bodies from movement along the corridors. During loading of the carriage, the guides are moved to engage the bottle collars and the side walls are moved apart. During unloading of the carriage, the side walls are moved inward to lock the bottles and the guides are moved apart so that the gripper (52) can enter the carriage from above.

8 Claims, 13 Drawing Sheets

PALLETIZER FOR ARTICLES MANIPULATED BY SUSPENSION

This invention relates to a palletizer for articles, in particular for light unstable plastic bottles, having a neck provided with a collar by which they are manipulated by suspension.

Palletizers of this type are known comprising a loader carriage provided with a plurality of parallel horizontal corridors for receiving the articles, and a movable transfer head for withdrawing the articles from the loader carriage from above and transferring them together to the next station.

An object of this invention is to improve the known machines, in particular with the aim of:
- intrinsically shortening the machine operating cycles by reducing idle times;
- simplifying the adjustment of the bottle guide members when the neck diameter changes;
- providing transfer heads in which the gripping means are closer together.

This and other objects are attained by the invention as characterised in the claims.

The invention is based on the fact that each horizontal corridor comprises:
- a pair of guides enabling the articles, suspended by their collar, to slide along the entire corridor,
- means for moving the guides into a position of mutual approach, in which the guides enable the articles to slide, and vice versa into a position of mutual withdrawal, in which the guides lie at a distance apart such as to release the collar of the articles,
- a pair of side walls positioned externally to the pair of guides, to lock the articles along the entire length of the corridor, and
- means for moving the side walls into a position of mutual approach, in which the side walls lock the position of the articles lying within the corridor, and vice versa into a position of mutual withdrawal, in which the side walls are at such a distance apart as not to interfere with the movement of the articles along the corridor.

Moreover, during the loading of the articles into the loader carriage the slide guides are maintained in their position of mutual approach, and the locking side walls are maintained in their mutually withdrawn position, and during the withdrawal of the articles by the transfer head the slide guides are moved into their mutually withdrawn position and the locking side walls are made to approach each other to lock the articles in position; finally, said gripping means of the transfer head are made to penetrate from above, through the top of the corridors, between the pair of upper guides arranged in their mutually withdrawn position, to grip the articles by their collars.

The invention is described in detail hereinafter with the aid of the accompanying figures, which show a non-exclusive embodiment thereof by way of example.

The illustrated palletizer is used to palletize articles 9 consisting in practice of plastic bottles (usually light and unstable) having a neck 91 presenting a circular collar 92, of constant thickness, projecting radially outwards in the manner of a thin horizontal plate, by which the article 9 is manipulated in suspended manner.

The palletizer comprises an intermediate station 3 having a loader carriage 10 provided with a plurality N of horizontal parallel corridors 11, arranged to receive the articles 9; by convention, the direction defined by the axes of the corridors 11 is indicated herein as the "longitudinal direction".

The station 3 is fed by a number of feed channels 4 of known type, along which the articles 9 are made to advance one behind another. The number of feed channels 4 is less than the number of corridors 11 of the loader carriage 10, the distance between their axes being equal to a multiple of the distance between the axes of two adjacent corridors 11.

The intermediate station 3 comprises a fixed frame 12 which slidably supports the loader carriage 10 and means for advancing the carriage 10 along the frame 12 in predetermined steps in a transverse direction (i.e. the horizontal direction perpendicular to the transverse direction) such that the feed channels 4 are able to feed all the corridors 11 of the loader carriage 10.

The palletizer also comprises a transfer means 5 having a movable transfer head 50 operated by suitable known mover means 51 (a rotary column, a robot, . . . ), to withdraw, by descending from above, the articles 9 positioned in the loader carriage 10 and to transfer them to a separately located receiver station 2.

Figure 1:
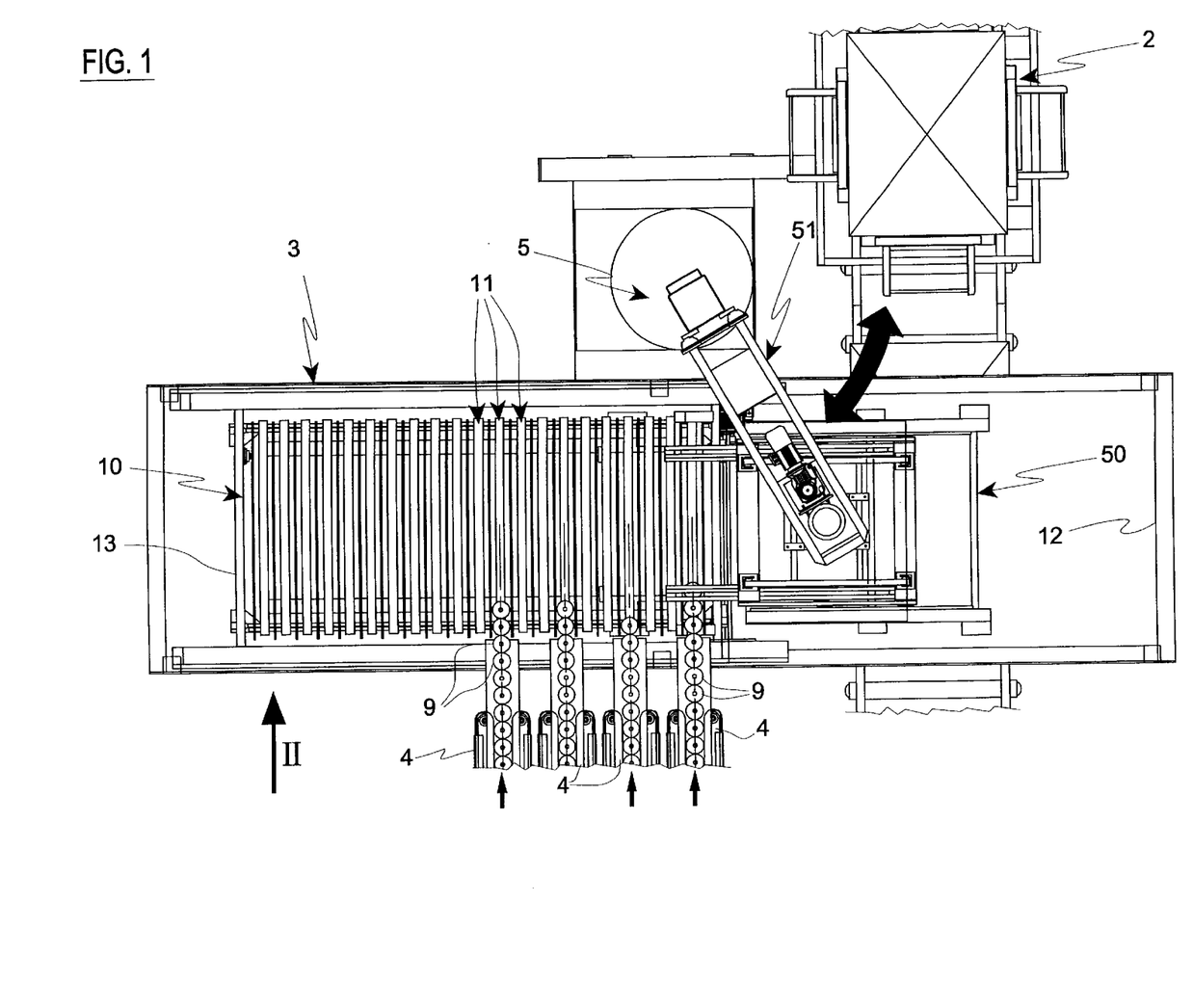
FIG. 1 is a plan view of the palletizer and relative plant parts taken from above.
Figure 2:
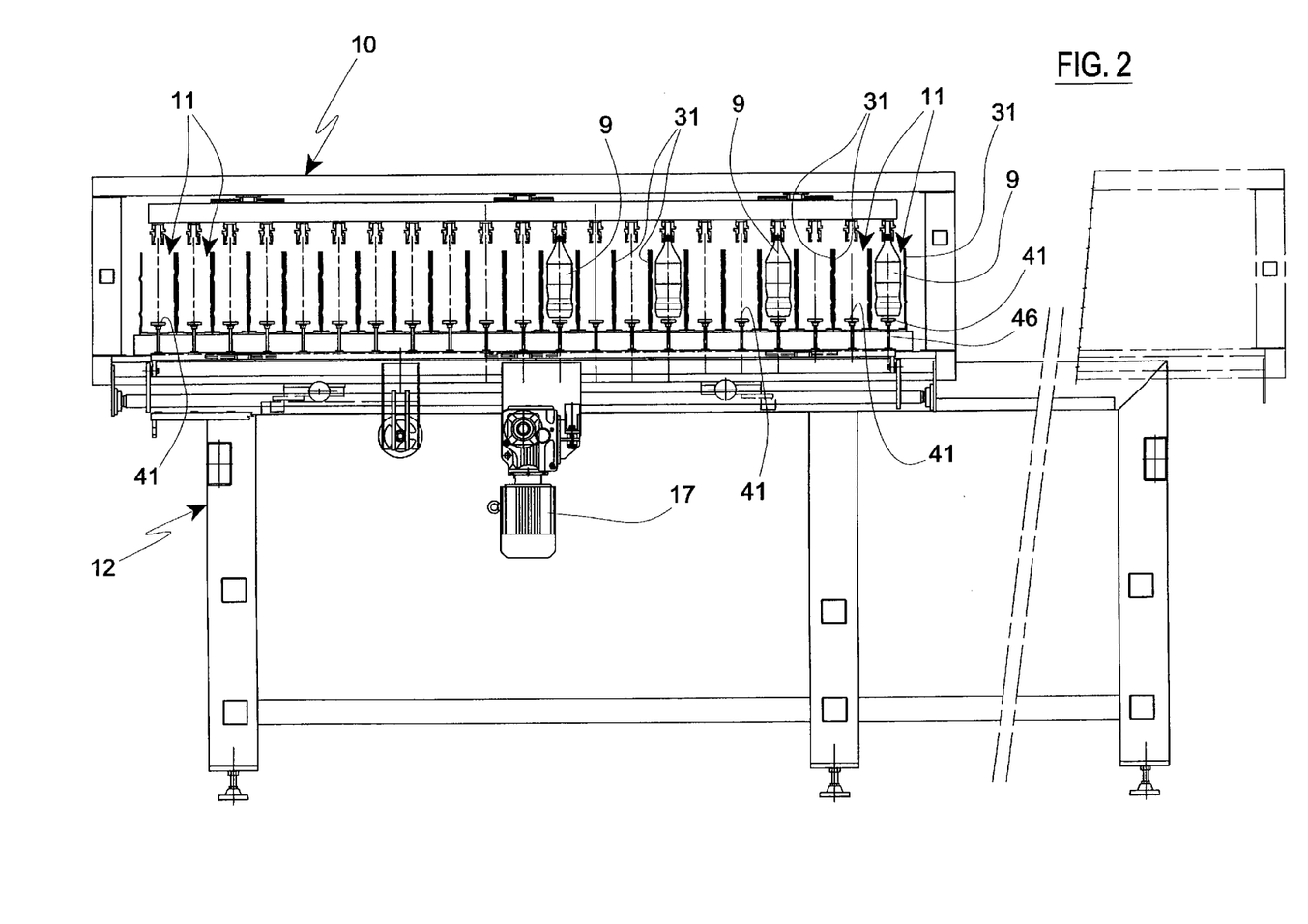
FIG. 2 is a vertical side elevation, taken in the direction of the longitudinal arrow II of FIG. 1, of the palletizer of the invention, without the transfer head.
Figure 3:
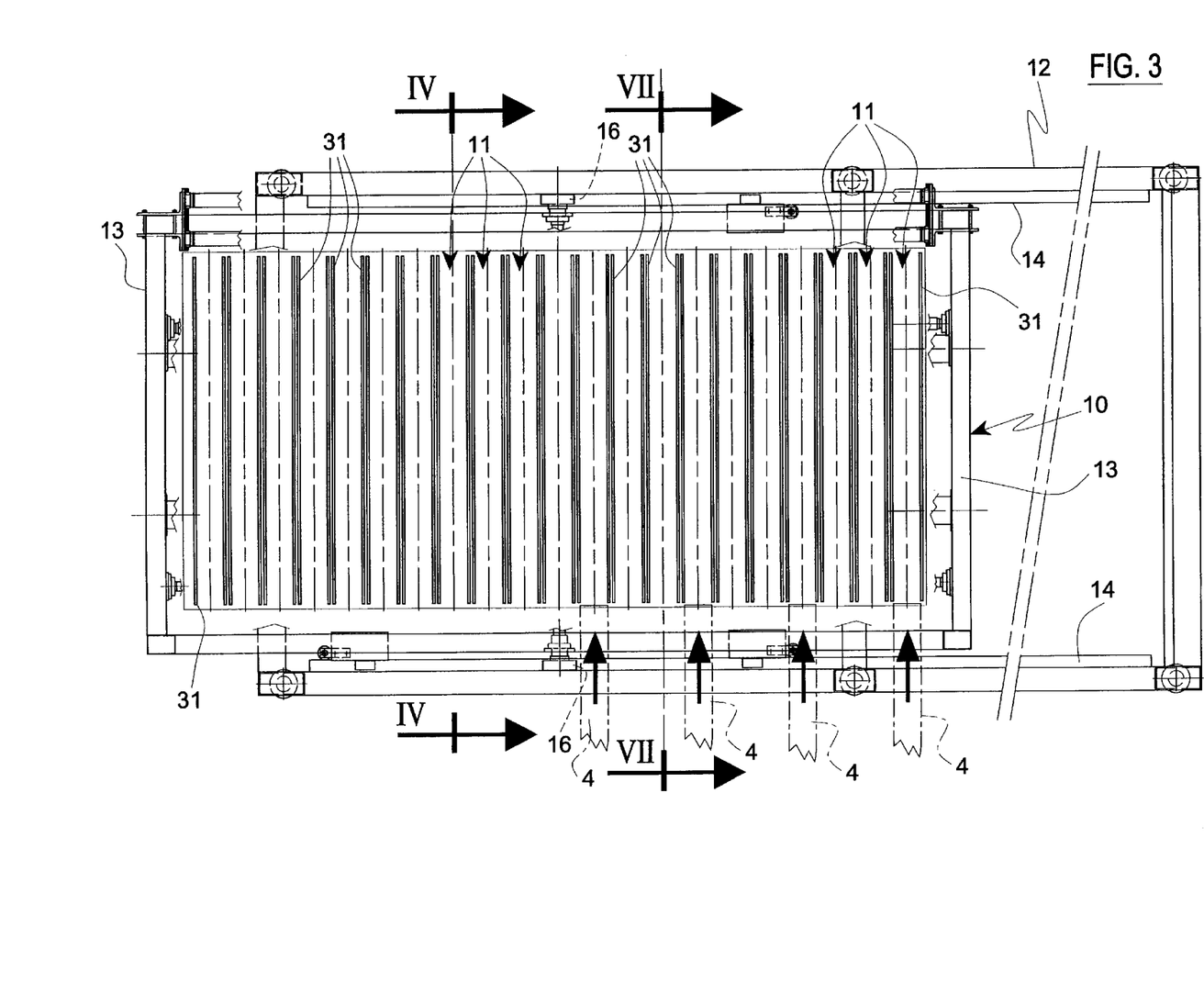
FIG. 3 is a simplified plan view of FIG. 2 from above, with some members lacking in order to display others.
Figure 4:
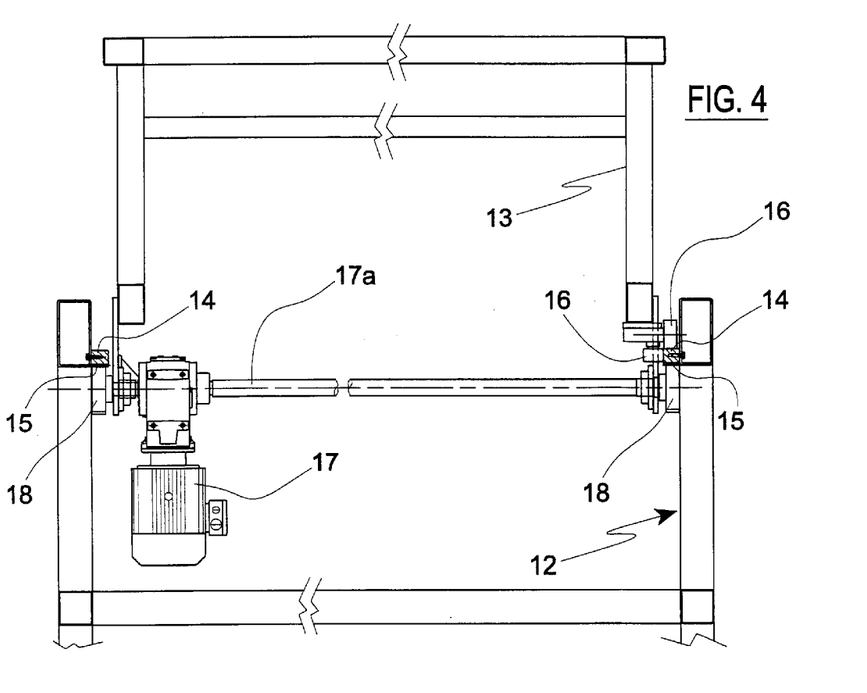
FIG. 4 is a section on the longitudinal plane IV—IV of FIG. 3, showing only the fixed frame 12 and the loader carriage 10.
Figure 5:
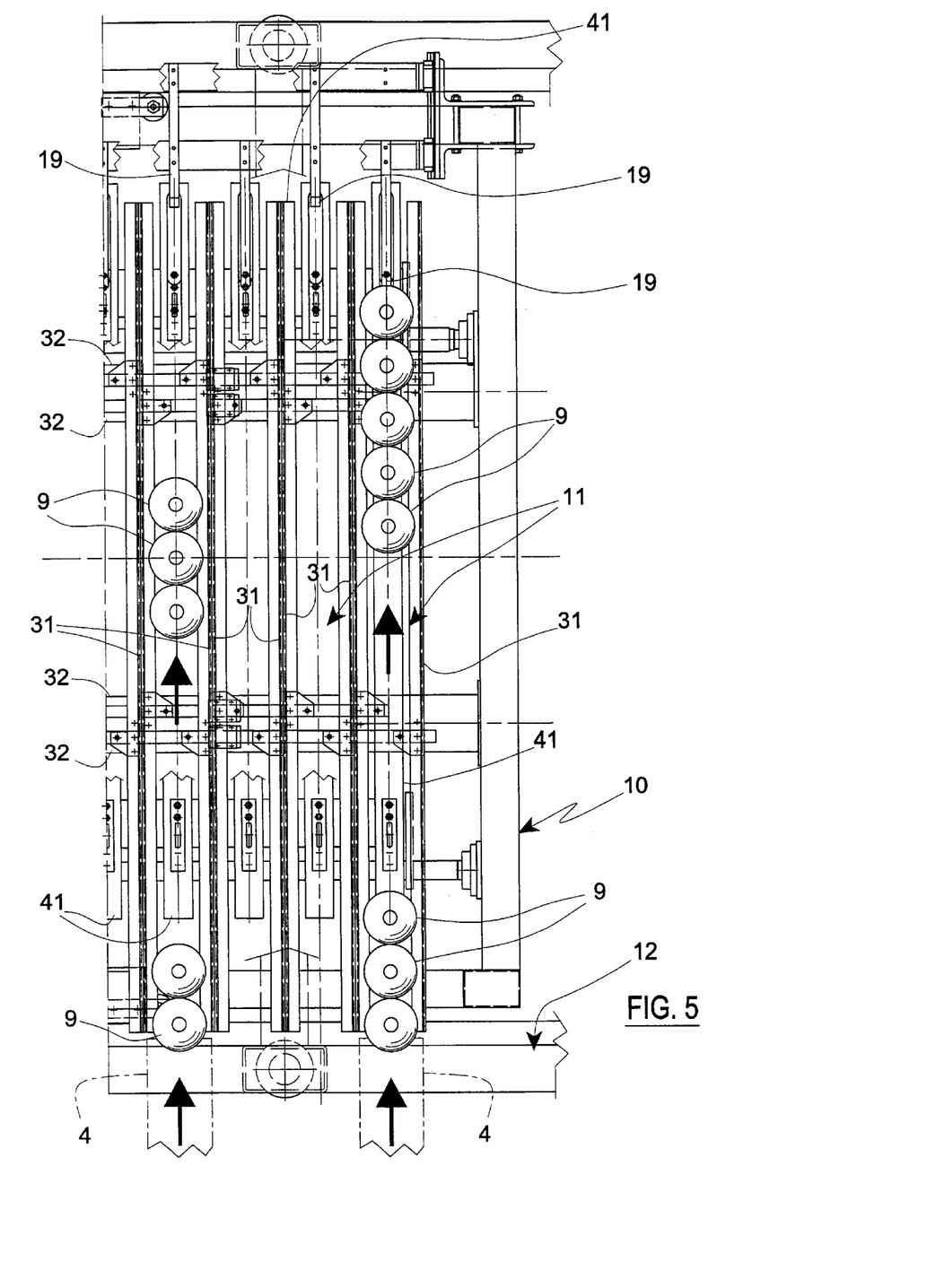
FIG. 5 shows an enlarged more detailed part of FIG. 3, but with the upper support guides 21 lacking.

In detail, the loader carriage 10 comprises a rigid support frame 13 which is composed of beams extending along the corners of a parallelepiped, and rests via idle wheels 16 on two horizontal transverse guides 14 positioned on the two sides of the fixed frame 12 (see FIGS. 2 and 4). The sliding movement is achieved by a gearmotor 17 which by means of a shaft 17a drives two pinions 18 engaging two racks 15 fixed to the lower face of the guides 14.

Each corridor 11 of the loader carriage 10 comprises:
- a pair of upper guides 21, enabling the articles 9, suspended by their collar 92, to slide along the entire corridor 11,
- a pair of side walls 31 positioned externally to the side of the pair of guides 21, to define the longitudinal sides of the corridor, and arranged to lock the articles 9 along the entire length of the corridor 11, and
- a lower support element 41 for the lower end of the article 9, which lies at a short distance from said lower end when the article 9 slides suspended from the slide guides 21.

Figure 6:
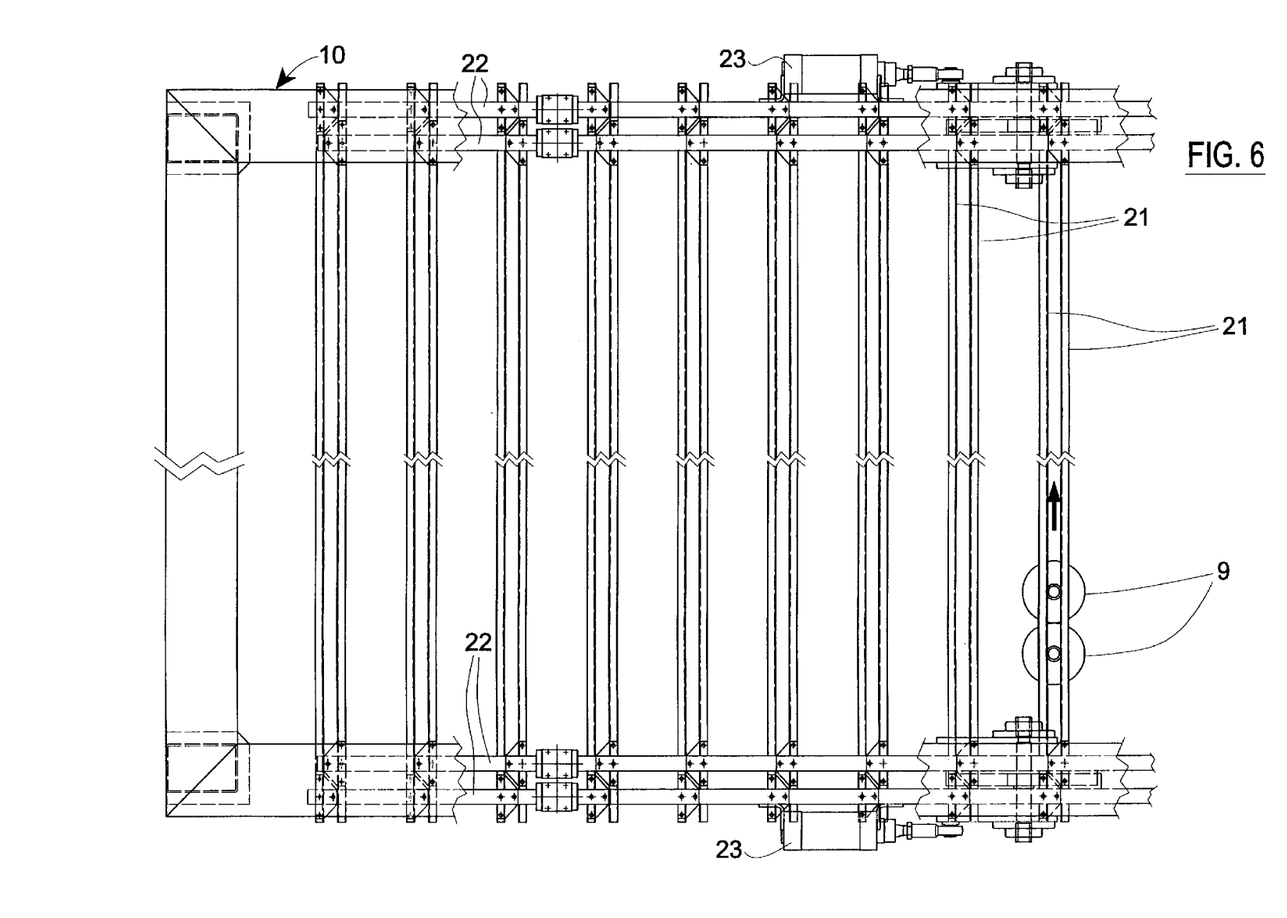
FIG. 6 is an enlarged detail of FIG. 3 showing only the upper slide guides 21.
Figure 7:
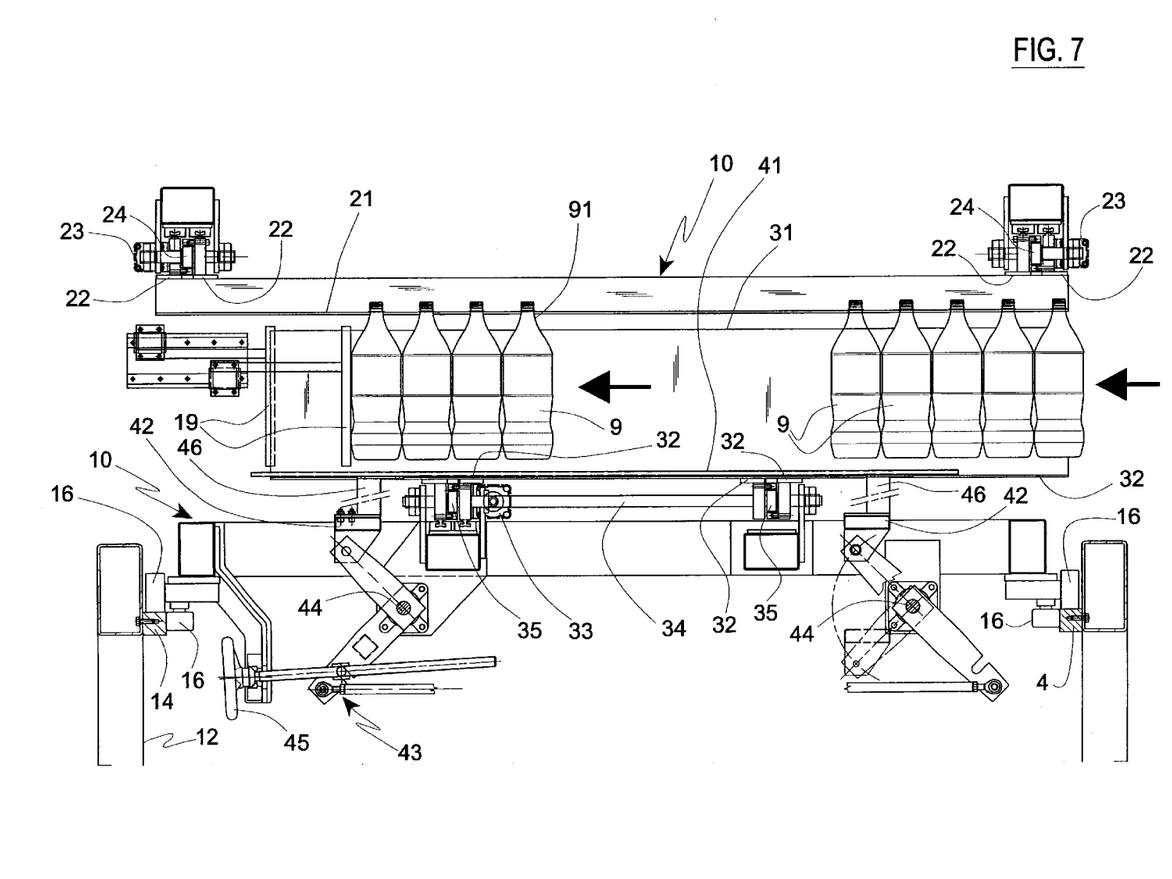
FIG. 7 is a section on the longitudinal plane VII—VII of FIG. 3.
Figure 7A:
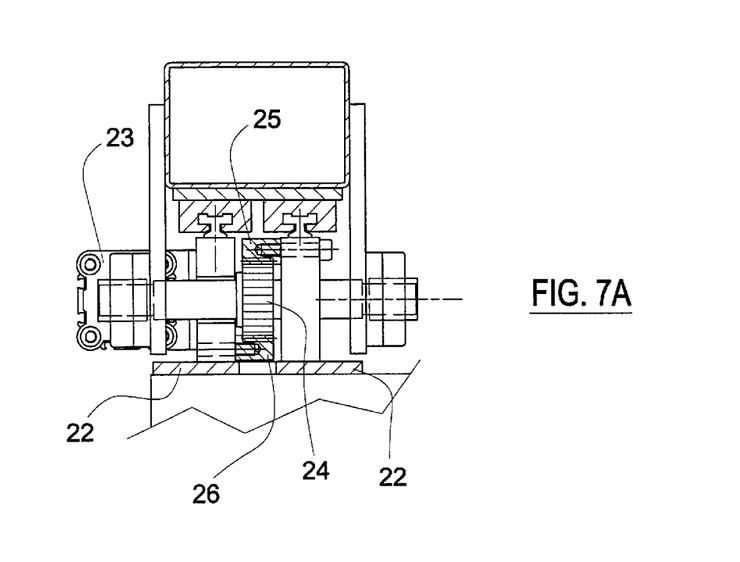
FIG. 7A is an enlarged detail of FIG. 7.
Figure 8:
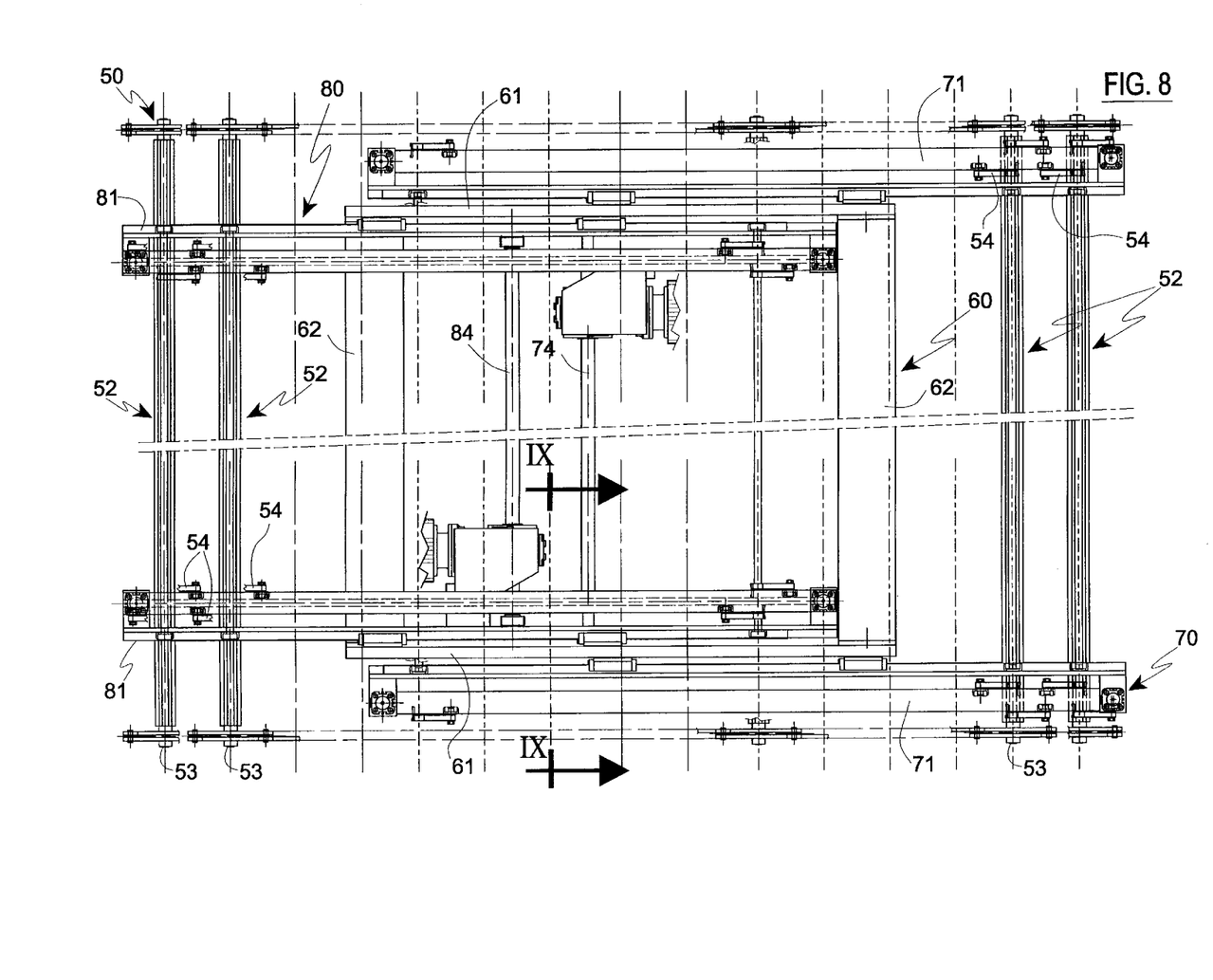
FIG. 8 is a plan view of the transfer head taken from above.

The loader carriage 10 possesses means for moving the guides into a position of mutual approach, in which they enable the articles 9 to slide, and vice versa into a position of mutual withdrawal, in which the guides 21 lie at a distance apart such as to release the collar 92 of the articles 9. These means comprise two pairs of horizontal transverse support beams 22 positioned in the upper end part of the movable frame 13, in correspondence with the ends of the corridors 11, to each said pair there being joined the left guides 21 and respectively the right guides 21 of each corridor 11. Means are also provided for causing said beams 22 to approach or withdraw from each other, these means comprising, on each side of the frame 13, a cylinder-piston unit 23 which operates a mechanism for making one beam 22 translate in one direction and the other beam 22 translate in the other direction. Said mechanism, shown in FIG. 7A, comprises a pinion 24 rotated by the cylinder-piston unit 23 (shown in FIG. 6) and engaging upperly a rack 25 fixed to a first beam 22 and lowerly a second rack 26 fixed to a second beam 22; rotation of the pinion 24 hence causes the two beams 22 to move in the two opposing directions.

The loader carriage 10 also possesses means for moving the side walls 31 into a position of mutual approach, in which they press against the sides of the articles lying in the corridor 11 and lock them in position, and vice versa into a position of mutual withdrawal, in which the side walls 31 are at such a distance apart as not to interfere with the movement of the articles 9 along the corridor 11. These means for moving the side walls 31 comprise two pairs of transverse horizontal beams 32 positioned in the lower end part of the movable frame 13 and to which the lower ends of the left side walls 31 and respectively right side walls 31 of each corridor 11 are joined. Means are also provided for causing said beams 32 to approach or withdraw from each other, these means comprising, on each side of the frame 13, a cylinder-piston unit 33 which operates a mechanism for making one beam 32 translate in one direction and the other beam 32 translate in the other direction. Said mechanism (visible in FIG. 7) is totally similar to that shown in FIG. 7A for moving the guides 21, and comprises a shaft 34 rotated by the cylinder-piston unit 33 and carrying at its two ends two pinions 35, each engaging upperly a rack 36 fixed to a first beam 32 and lowerly a second rack 37 fixed to a second beam 22; rotation of the pinion 35 hence causes the two beams 32 to move in the two opposing directions.

All the support elements 41 are supported by a pair of horizontal transverse beams 42 positioned below the side walls 31, their position being adjustable in height by a crank mechanism 43 pivoted on transverse shafts 44 and operated manually by a handwheel 45. On the beams 42 there are fixed a plurality of pairs of vertical rods 46, each pair projecting upwards between two side walls 31, along the central plane of each corridor 11, and supporting at their upper end a respective element 41.

At the downstream end of each corridor 11 (i.e. at that end on the side distant from that to which the feed channels 4 are applied) there is a respective stop element 19 for that article 9 lying at the head of the row of articles inserted into each corridor 11.

The head 50 comprises a plurality N of gripping means 52 arranged to grip the articles located in the corridors 11 of the loader carriage 10 from above.

Each gripping means 52 comprises a pair of thin jaws 52a extending in longitudinal vertical planes and spaced apart at a distance less than the distance between two side walls 31 and than the gap between the pair of guides 21 when these are in their position of mutual withdrawal, so that they are able to penetrate, by a vertical descending movement from above, into a respective corridor 11 of the loader carriage 10.

The longitudinal dimension of each jaw 52a is such as to involve an entire row of articles 9 accumulated within the respective corridor 11. Each means 52 comprises a longitudinal horizontal support shaft 53 positioned above the pair of jaws 52a, which are supported by and hinged to the shaft 53.

The head 50 comprises an intermediate horizontal rectangular frame 60 composed of two transverse lateral beams 61 and two longitudinal beams 62, and fixed to a mover means 51 (of known type and illustrated only schematically in the figures), which supports two flat, horizontal rectangular lateral frames 70 and 80 positioned on one and the opposite side, in the transverse direction, of the intermediate frame 60. The two lateral frames 70 and 80 are slidable in a direction transverse to the intermediate frame 60, to give rise to an overall frame having a longitudinal dimension substantially equal to that of the loader carriage 10 and a transverse dimension variable between a maximum value (at which the lateral frames 70 and 80 are at their maximum distance apart) virtually equal to that of the loader carriage 10 and a minimum valve (in which the lateral frames are at their minimum distance apart) substantially less than the maximum.

The lateral frame 70 is formed from two transverse lateral beams 71 (parallel to the beams 61) secured, with the ability to slide in a direction transverse to the intermediate frame 60, by guides 72 slidable within slide blocks 73 fixed to the beams 61. The beams 71 are moved by a motorized shaft 74 which at its two ends rotates two pinions 74a engaged with respective racks 74b fixed to the beams 71.

Likewise, the other lateral frame 80 is formed from two transverse lateral beams 81 (parallel to the beams 61) secured, with the ability to slide in a direction transverse to the intermediate frame 60, by guides 82 slidable within slide blocks 83 fixed to the beams 61. The beams 81 are moved by a motorized shaft 84 which at its two ends rotates two pinions 84a engaged with respective racks 84b fixed to the beams 81.

Figure 9:
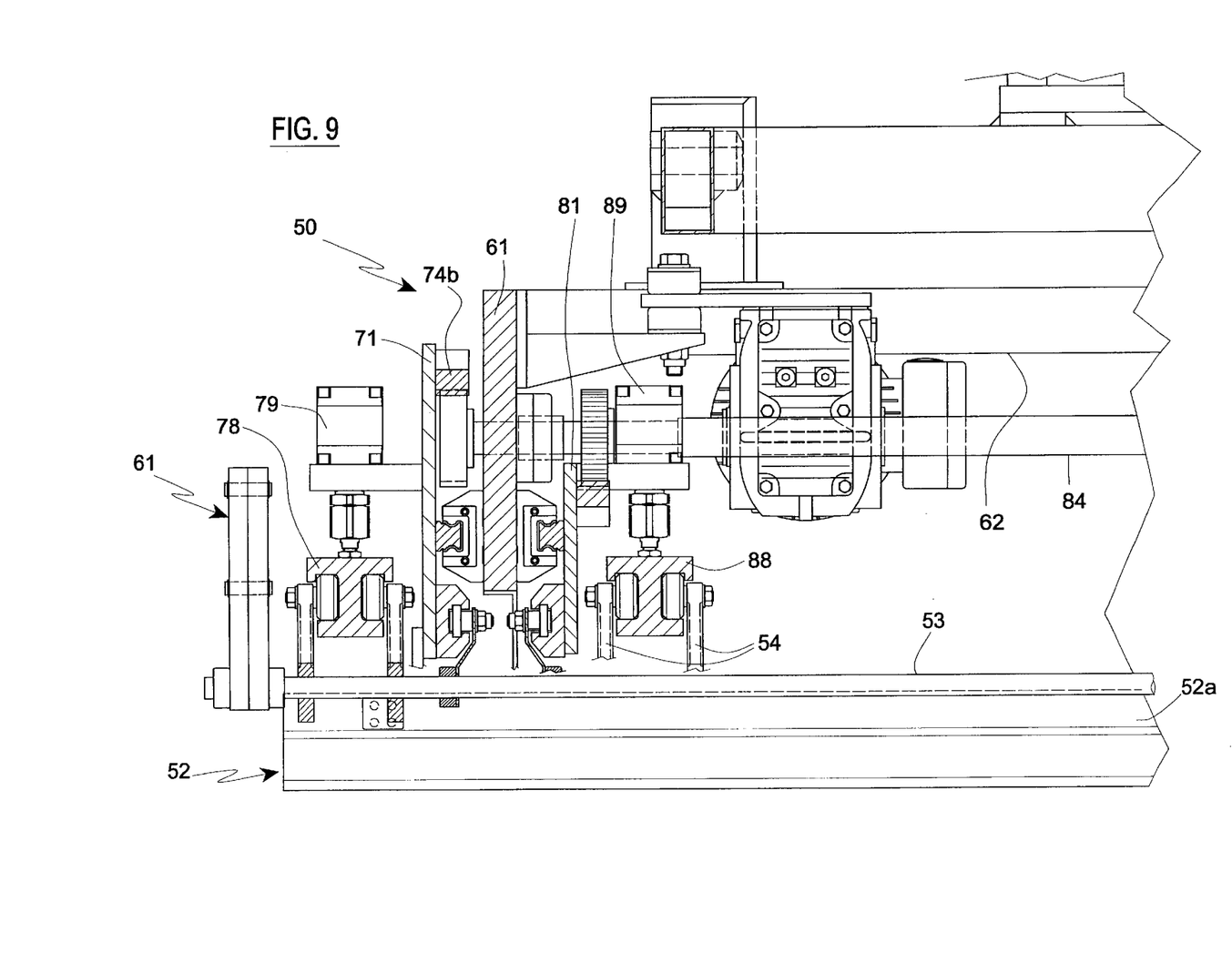
FIG. 9 is a section on the plane IX—IX of FIG. 8.
Figure 9A:
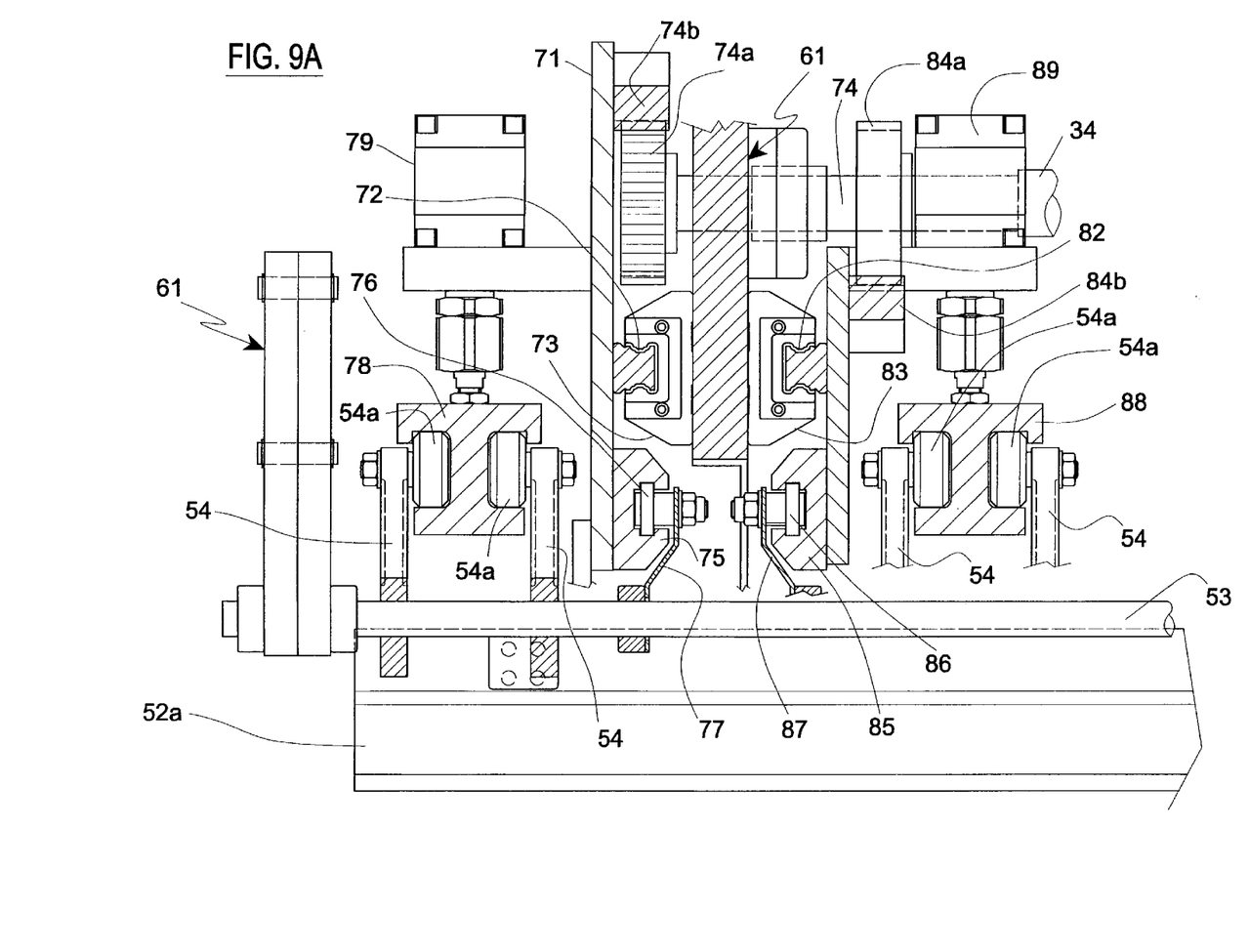
FIG. 9A is an enlarged detail of FIG. 9.

The lateral frame 70 supports a number of shafts 53 equal to one half of the entire plurality N, they being secured to the frame 70 with the ability to slide relative thereto in a transverse direction; each shaft 53 is suspended from the beams 71 by a pair of brackets 77 rotoidally coupled (pivoted) to the shaft 53 and carrying at their upper end respective idle rollers 76 slidably engaged in two guides 75 fixed to the beams 71 (see FIGS. 9 and 9A).

Likewise, the other lateral frame 80 supports the other half of the plurality N of shafts 53, which are secured to the frame 80 with the ability to slide relative thereto in a transverse direction; each shaft 53 is suspended from the beams 81 by a pair of brackets 87 rotoidally coupled (pivoted) to the shaft 53 and carrying at their upper end respective idle rollers 86 slidably engaged in two guides 85 fixed to the beams 81.

The two end shafts 53 positioned on the outside of the lateral frames 70 and 80 are instead fixed rigidly to these lateral frames.

Finally, all the shafts 53 are connected together by two pantograph mechanisms 65 located on the two opposing ends of the shafts outside the frames 70 and 80, to enable the shafts 53, and with them the gripping means 52, to approach or withdraw from each other with uniform movements when the two lateral frames are made to approach or withdraw from each other.

Figure 11A:
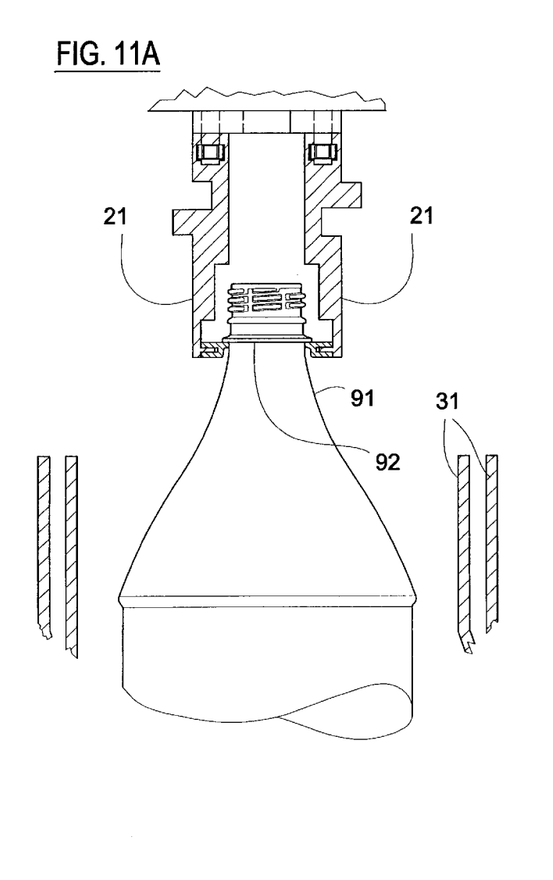
FIG. 11A is an enlarged detail of FIG. 10A.
Figure 11C:
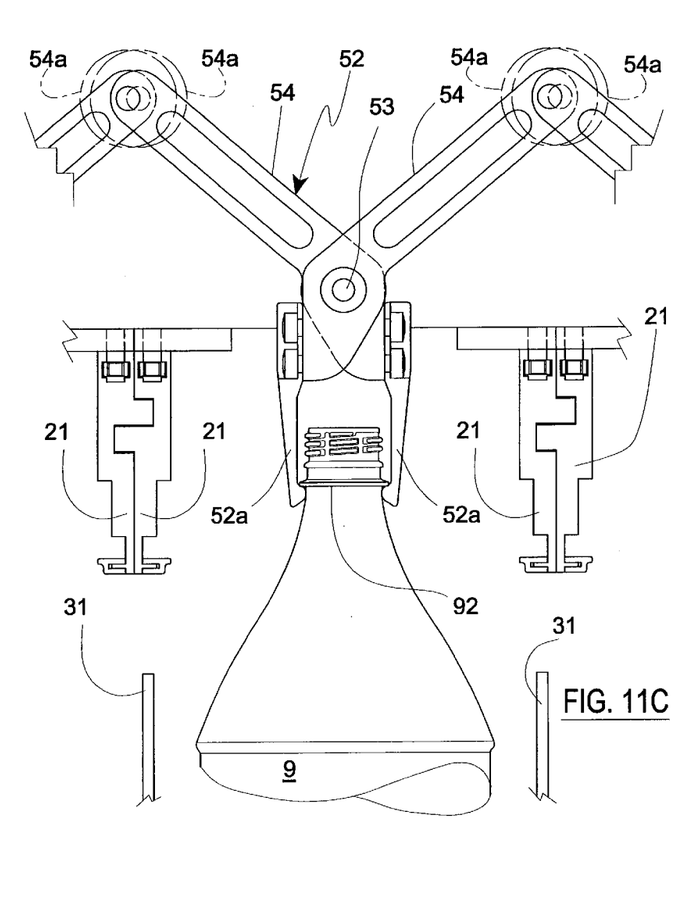
FIG. 11C is an enlarged detail of FIG. 10C.

To each jaw 52a there are joined two upwardly inclined levers 54, each located at one longitudinal end of the jaw, they carrying two idle wheels 54a pivoted to their upper free end (see FIG. 11C). The levers 54 of the right jaw 52a are inclined upwards towards the left, whereas the levers 54 of the left jaw are inclined upwards towards the right.

Those wheels 54a of all the levers 54 located at one of the two ends of the gripping means 52 supported by the lateral frame 70 engage in a pair of bilateral guides 78 parallel to the near beam 71 of the frame. The guides 78 are two in number (provided in a single longitudinal member) for space reasons, one guide 78 housing the wheels relative to the right jaw 52a and the other guide 78 housing those relative to the left jaw 52a. Both the guides 78 are driven to translate in a vertical direction by a pair of cylinder-piston units 79 fixed to the beam 71 (see FIG. 9A). An equal and symmetrical pair of guides 78 are applied to the other beam 71 of the frame 70, to engage in the same manner the wheels 54a of all those levers 54 positioned at the other end of the gripping means 52 supported by the lateral frame 70.

As provided for the lateral frame 70, for the lateral frame 80 there are also provided a double pair of bilateral guides 88 parallel to the near beam 81 of the frame 80 and supported thereby, and in which the wheels 54a of all the levers 54 of the gripping means 52 supported by the lateral frame 80 engage, these guides being driven to translate in a vertical direction by a pair of cylinder-piston units 89 fixed to the beam 81.

The upward translation of the guides 78 and 88, in combination with the fact that the shafts 53 fixed (with respect to their movement in a vertical direction), causes the two wheels 54a of each pair of levers 54 to withdraw from each other, with consequent mutual approach of the two jaws 52a. In contrast, the upward translation of said guides causes the two jaws 52a to move apart.

Moreover, when the two lateral frames 70 and 80 are made to approach or withdraw from each other, the wheels 86 supporting the shafts 53 slide along the guides 75 and 85, while simultaneously the wheels 54a of the levers 54 slide freely along the guides 78 and 88.

According to the invention, the palletizer comprises means for controlling the operation of the machine members, these being programmed such that:

during the loading of the articles 9 into the loader carriage 10, the slide guides 21 are maintained in their position of mutual approach, and the locking side walls 31 are maintained mutually withdrawn, and during the withdrawal of the articles 9 by the transfer head 50, the slide guides 21 are moved into their withdrawn position and the locking side walls 31 are made to approach each other to lock the articles 9 in position.

Moreover the gripping means 52 of the transfer head 50 are made to penetrate from above, through the top of the corridors 11, between the pair of slide guides 21 arranged in their withdrawn position, and grip the articles 9 by their collars 92.

In detail, the palletizer operates in the following manner.

During the first stage of the operating cycle, the articles 9 are inserted into the corridors 11 of the loader carriage 10 such as to fill all the corridors. The articles 9 are inserted into the corridors 11 via the feed channels 4 along which the articles 9 are made to advance one behind another, in the longitudinal direction.

Figure 10A:
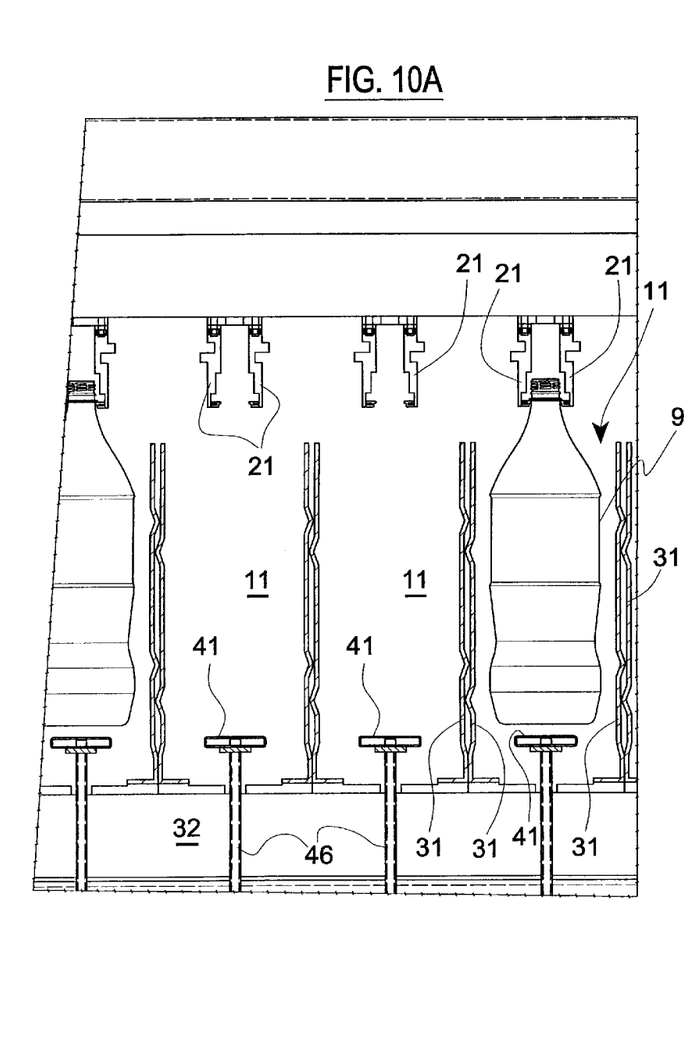
FIGS. 10A, 10B, 10C and 10D show the same enlarged detail of FIG. 2 in four successive operating stages.

During this stage the guides 21 are in their position of mutual approach, so as to act as a guide and support rail for the articles 9, which advance within the corridor 11, urged by other articles 9 lying behind them, so that suspended by their collar 92 they finally accumulate against the stop element 19. At the same time the side walls 31 are maintained in their mutually withdrawn position, spaced from the sides of the articles 9, with the support element 41 being slightly lower than the base of the articles 9 so as not to obstruct their advancement (see FIG. 10A).

Figure 10B:
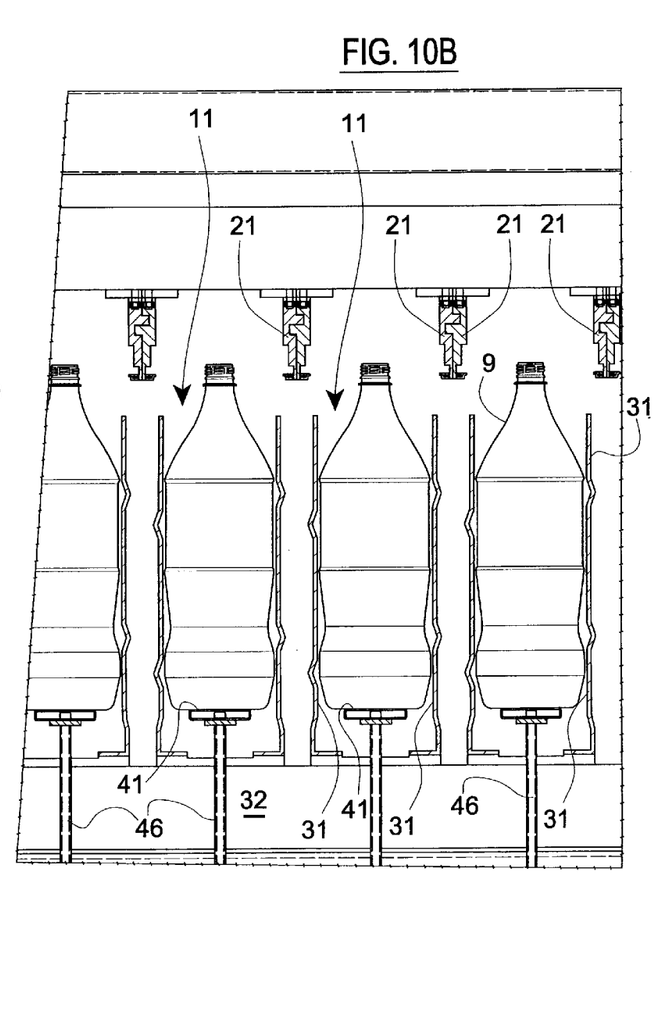

The loader carriage 10 advances stepwise in a transverse direction so that all its corridors 11 become once only aligned with a feed channel 4, so that all the corridors 11 become filled with articles 9. When the loader carriage 10 has been totally filled, all the guides 21 are withdrawn from each other to their maximum possible distance apart, to leave a wide passage mouth free above the relative corridors 11; this causes the articles 9 resting on the elements 41 to descend (through a very short distance); immediately afterwards, the side walls 31 are made to approach each other to lock the articles in position (see FIG. 10B).

Figure 10C:
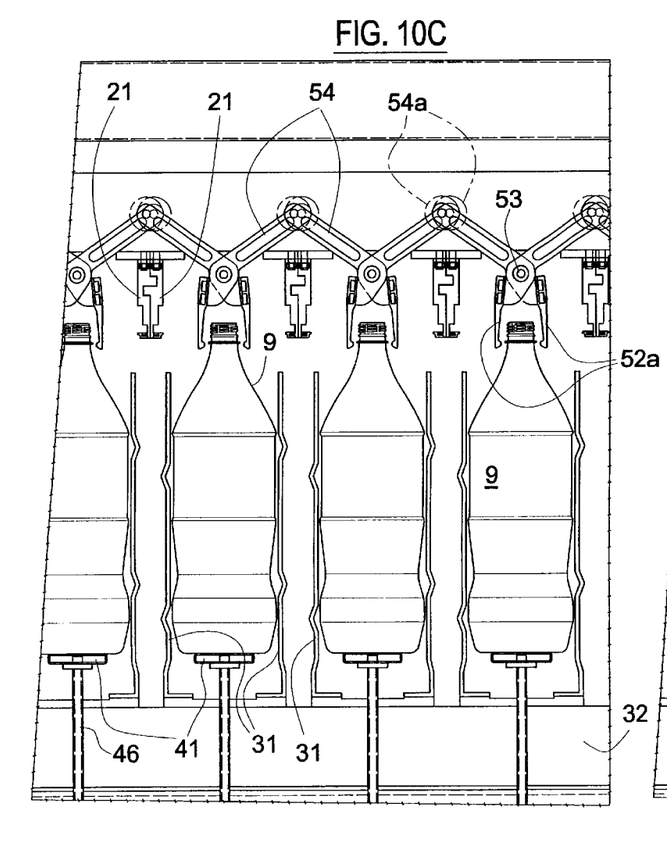
Figure 10D:
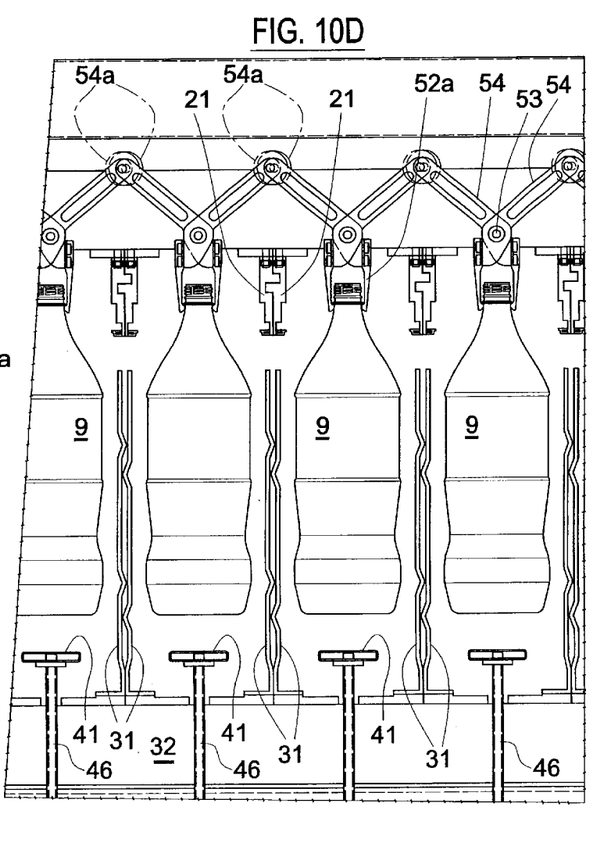

When the loader carriage 10 has been filled the transfer head 50 lies above and in correspondence with the carriage 10, with the gripping means 52 spaced apart so that they are exactly aligned with the vertical through the corridors 11. The head 50 is then lowered towards the loader carriage 10, and its gripping means 52 are made to penetrate, with their jaws 52 in their withdrawn position, through the top of the corridor 11 (specifically through the mouth left open by the open guides 21), to below the collars 92 of the articles (see FIG. 10C); having attained this position the jaws 52a are closed onto the collars 92 to grip the articles 9, the transfer head 50 then being retracted upwards so that all the articles are extracted from the loader carriage 10 (see FIG. 10D).

At this point the loader carriage 10 begins a new loading cycle for the articles 9, by which all its corridors 11 are filled, as hereinbefore described. At the same time, the transfer head 50 moves all the gripping means 52 towards each other in order to form a group of close-together articles in mutual contact. This operation is performed by moving the two lateral frames 70 and 80 towards each other, by which all the gripping means 52 are made to approach each other uniformly. Advantageously, the articles 9 can be arranged mutually offset to form a quincunx arrangement, by disposing the stop elements 19 alternately offset within the corridors 11.

At the same time the head 50 is brought by the mover means 51 to above the receiver station 2, where it releases the group of contacting articles 9. It then returns to its described initial position above the intermediate station 3, to withdraw a new group of articles from the carriage 10.

By virtue of the invention, the machine operating cycles are made intrinsically shorter in that while the transfer head 50 performs the operations involved in transferring the articles from the carriage 10 to the receiver station 2, the carriage 10 is free to load the articles into the corridors 11.

Moreover, as the guides 21 are movable in a transverse direction, it is more simple to adjust their distance apart when in their position of mutual approach, in order to adapt them to different diameters of the necks 91 of the articles 9. For example multi-stage cylinder-piston units 23 can be provided, hence able to assume more than one extended position.

In addition, as the gripping means 52 are used only to grip the articles, the jaws 52a can be very flat in shape and can hence be maintained relatively close together; this is in contrast to the known art in which the jaws also act as guide means for the articles. Numerous modifications of a practical and applicational nature can be made to the invention, but without leaving the scope of the inventive idea as claimed below.

What is claimed is:

1. A palletizer for articles having a neck provided with a collar by which they are manipulated by suspension, comprising a loader carriage (10) provided with a plurality of parallel horizontal corridors (11) for receiving the articles, and a movable transfer head (10) for withdrawing the articles from the loader carriage (10) from above and transferring them to a separate station (3), and comprising a plurality of gripping means (52) for withdrawing the articles positioned in the corridors (11) of the loader carriage (10), characterised in that each corridor (11) comprises:

a pair of guides (21), enabling the articles, suspended by their collar (92), to slide along the entire corridor 11, means (22, 26) for moving the guides (21) into a position of mutual approach, in which the guides (21) enable the articles to slide, and vice versa into a position of mutual withdrawal, in which the guides (21) lie at a distance apart such as to release the collar (92) of the articles, a pair of side walls (31) positioned externally to the pair of guides (21), to lock the articles along the entire length of the corridor (11), means (32, 37) for moving the side walls (31) into a position of mutual approach, in which the side walls (31) lock the position of the articles lying within the corridor (11), and vice versa into a position of mutual withdrawal, in which the side walls (31) are at such a distance apart as not to interfere with the movement of the articles along the corridor (11), during the loading of the articles into the loader carriage (10) the slide guides (21) being maintained in their position of mutual approach, and the locking side walls (31) being maintained in their mutually withdrawn position, and during the withdrawal of the articles by the transfer head (50) the slide guides (21) being moved into their mutually withdrawn position and the locking side walls (31) being made to approach each other to lock the articles in position, said gripping means (52) of the transfer head (50) being made to penetrate from above, through the top of the corridors (11), between the pair of upper guides (21) arranged in their mutually withdrawn position, to grip the articles by their collars (92).

2. A palletizer as claimed in claim 1, characterised in that said means for moving the slide guides (21) comprise transverse beams (22) to which the left and respectively right guides (21) of each corridor (11) are joined, and means (23–26) for causing said beams (22) to approach or withdraw from each other, said beams (22) being disposed in correspondence with the ends of the corridors (11).

3. A palletizer as claimed in claim 1, characterised in that said means for moving the side walls (31) comprise transverse beams (32) to which the left and respectively right guides (31) of each corridor (11) are joined, and means (33–37) for causing said beams (32) to approach or withdraw from each other.

4. A palletizer as claimed in claim 1, characterised in that each corridor (11) comprises, for the lower end of the article, a lower support element (41), which lies at a short distance from said lower end when the article slides suspended from the slide guides (21).

5. A palletizer as claimed in claim 1, comprising a number of feed channels (4) less than the number of corridors (11) of the loader carriage (10), characterised by comprising a fixed frame (12) which slidably supports the loader carriage (10) and means for advancing the carriage (10) in predetermined steps such that the feed channels (4) are able to feed all the corridors (11) of the loader carriage (10).

6. A palletizer as claimed in claim 1, characterised in that the transfer head (50) comprises two lateral frames (70, 80) able to be made to approach and withdraw from each other and defining a single overall support frame for the gripping means (52), its transverse dimension varying as a result of the mutual movement of the two movable frames (70, 80).

7. A palletizer as claimed in claim 6, characterised in that each lateral frame (70, 80) supports a number of support shafts (53) equal to one half of the plurality N of these shafts, to which the jaws of the gripping means (52) are hinged, and which can slide in a transverse direction, in particular by means of a pair of guides (75, 85) fixed to the beams (71, 81) of the frame, and in which idle wheels (76, 86) slide, pivoted to a like number of brackets (77, 87) supporting the shafts (53).

8. A method for palletizing articles having a neck provided with a collar by which they are manipulated by suspension, by means of a palletizer comprising a loader carriage (10) provided with a plurality of parallel horizontal corridors (11) for receiving the articles, and a movable transfer head (10) for withdrawing the articles from the loader carriage (10) from above and transferring them to a separate station, and comprising a plurality of gripping means (52) for withdrawing the articles positioned in the corridors (11) of the loader carriage (10), each corridor (11) comprising:

a pair of guides (21), enabling the articles, suspended by their collar (92), to slide along the entire corridor (11), said guides (21) being movable between a position of mutual approach, in which the guides (21) enable the articles to slide, and a position of mutual withdrawal, in which the guides (21) lie at a distance apart such as to release the collar (92) of the articles, a pair of side walls (31) positioned externally to the pair of guides (21), to lock the articles along the entire length of the corridor (11), said side walls (31) being movable between a position of mutual approach, in which the side walls (31) lock the position of the articles lying within the corridor (11), and a position of mutual withdrawal, in which the side walls (31) are at such a distance apart as not to interfere with the movement of the articles along the corridor (11), during the loading of the articles into the loader carriage (10) the slide guides (21) being maintained in their position of mutual approach, and the locking side walls (31) being maintained in their mutually withdrawn position, and during the withdrawal of the articles by the transfer head (50) the slide guides (21) being moved into their mutually withdrawn position and the locking side walls (31) being made to approach each other to lock the articles in position, and said gripping means (52) of the transfer head (50) being made to penetrate from above, through the top of the corridors (11), between the pair of upper guides (21) arranged in their mutually withdrawn position, to grip the articles by their collars (92).

* * * * *